Jan. 17, 1950 — H. W. KOST — 2,494,882
SHEET METAL NUT
Filed Sept. 19, 1945
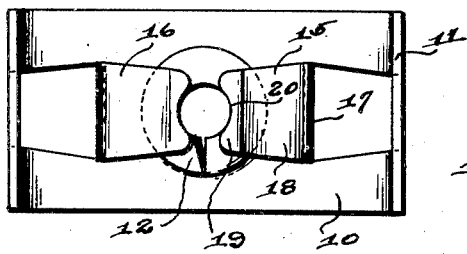
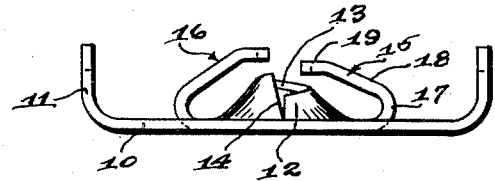
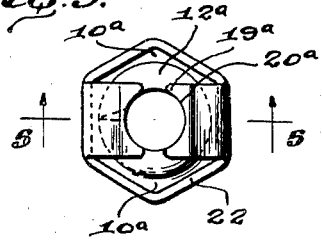
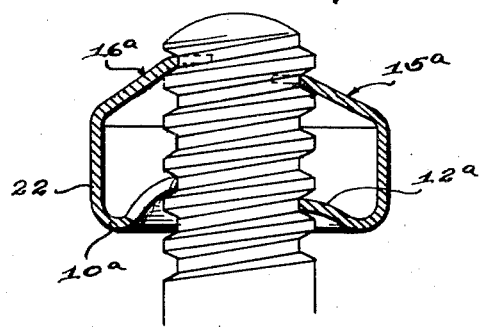
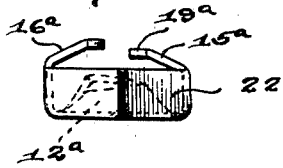
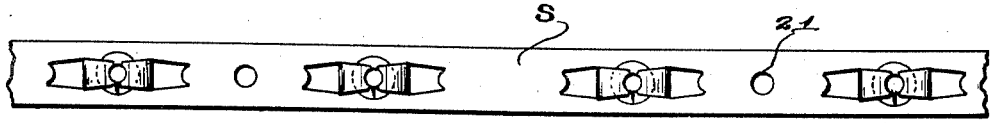
INVENTOR.
Harold W. Kost
BY
ATTORNEY Patented Jan. 17, 1950

2,494,882

UNITED STATES PATENT OFFICE 2,494,882

SHEET METAL NUT

Harold W. Kost, Birmingham, Mich., assignor, by mesne assignments, to Prestole Corporation, Toledo, Ohio, a corporation of Michigan Application September 19, 1945, Serial No. 617,353

1 Claim. (Cl. 151—21)

This invention relates to fasteners but more particularly to sheet metal fasteners adapted for engagement with a screw threaded shank and having provision for locking the fastener in place thereby to militate against loosening of the parts after they have been tightened and an object is to produce a one piece sheet metal fastener of the above type equipped with screw-receiving means and locking fingers or tongues cooperating therewith.

Another object is to produce a separate sheet metal nut adapted to receive a wrench and which is not only provided with a screw thread engaging portion but also has integral locking tongues forming a continuation of the wrench-receiving portion.

For purpose of illustration but not of limitation embodiments of the invention are shown in the accompanying drawings, in which Figure 1 is an enlarged top plan view of a fastener;

Figure 2 is a side edge elevation of the fastener shown on Figure 1;

Figure 3 is a top plan view of another form of fastener which is provided with a wrench-receiving rim;

Figure 4 is a side elevation of the fastener shown on Figure 3;

Figure 5 is an enlarged vertical sectional elevation of the fastener shown in Figure 3, showing the fastener mounted on a screw;

Figure 6 is a top plan view of a strip provided with a series of fasteners produced in accordance with this invention; and Figure 7 is an enlarged edge elevation of one of the fastener units shown on Figure 6.

The illustrated embodiment of the invention shown on Figures 1 and 2 comprises a one piece sheet metal fastener having a relatively flat base or body portion 10, the ends of which are turned upwardly into parallel relation to provide upstanding flanges 11. Formed centrally of the base portion 10 is an upwardly extending frusto conical protuberance 12, the upper edge 13 of which is in a form of a helix and the high and lower portions of the helix being separated by a radially extending slit 14. This protuberance provides a thread engaging fastener, well known commercially to those skilled in this art as a "Prestole." Further detailed description and illustration of the Prestole fastener is not considered necessary, but reference is hereby made to the patent to B. C. Place, No. 2,081,065 dated May 18, 1937, and to the patent to H. W. Kost, No. 2,169,182 dated Aug. 8, 1939. It will be understood that the above described Prestole fastener is adapted threadedly to receive a screw threaded shank after the manner of a conventional nut, except upon tightening the Prestole against the support, the helical edge 13 will be deformed thereby snugly and intimately to impinge against the root of the screw.

Struck out of the base 10 on opposite sides of the Prestole cone is a pair of tongues 15 and 16. As shown the free ends of the tongues are struck out from the flanges 11 prior to the flanging operation. In this instance the tongues taper outwardly from their free end portions to the base plate 10. As shown, the tongue 15 has an upwardly extending portion 17, curving upwardly from the base plate 10 and from the curved portion 17 the tongue inclines upwardly and inwardly as indicated at 18, which portion terminates in an end portion 19 overlying the upper portion of the cone 12. The tongue 16 is similarly formed except that the free end portion extends slightly above the end portion 19. The end portion of each of the tongues 15 and 16 is formed with an arcuate notch 20 for engagement between the threads of a screw. The arrangement is such that the free end of the tongue 15 is adjacent the lower portion of the helix 13, while the end of the tongue 16 is spaced above the high point of the helix 13.

It will be manifest that by introducing a screw into threaded engagement with the fastener, the threads of the screw first engage the Prestole cone 12 and then the tongues 15 and 16. After the screw is tightened to force the base plate 10 against the support, not only will the helical edge 13 be deformed more intimately to engage the screw threads, but also the tongues 15 and 16 will be drawn toward the base plate 10, thereby causing the notched portion 20 to be forced inwardly toward the axis of the screw. Thus the tongues 15 and 16 serve as a lock nut and insure against accidental or unwarranted loosening of the fastener from the screw. The tongues 15 and 16 may have inherently a spring or a resilient action, which materially contributes to their locking or holding function.

The form shown on Figures 1 and 2 and above described is that of a separate fastener unit to be applied to a screw in any suitable manner. However, in some instances it is desirable that a series of these fasteners be applied to one of the parts or panels, which are to be connected or assembled. Thus as shown in Figures 6 and 7, a sheet metal strip S may be employed of any suitable or desired length. At intervals the strip is formed with holes 21 to receive nails, screws, rivets or other suitable fasteners for mounting the strip on a supporting panel, for example. At spaced intervals in the strip S fasteners of the type above described, are formed, each fastener being provided with a Prestole cone and a pair of superposed locking tongues. Obviously the fastener units are formed by employing suitable dies and since the structure of the individual fastener units will be readily understood from the above description, further description thereof is not considered necessary.

In the modification shown on Figures 3 to 5, the fastener is shown with a base 10ª, which is provided with a frusto conical protuberance 12ª, similar to the protuberance 12 above described and constituting the well known Prestole fastener. The side portions of the base 10ª are bent upwardly to provide wrench engaging flanges 22. In this instance the flanges 22 are in the form of an integral hexagon, although the number of flange sides may be varied as desired. In this manner the Prestole cone 12ª is entirely surrounded by the integral upstanding flange, which not only protects the conical protuberance but also provides surfaces to which a wrench may be applied to tighten the fastener on the screw.

Forming a continuation of opposite flange portions are integral tongues 15ª and 16ª similar to the above tongues 15 and 16. As in the latter case the tongues 15ª and 16ª terminate in end portions 19ª, which are similarly formed with notches 20ª. Such fasteners may be readily applied to a screw threaded shank and by application of a wrench securely tightened in place. The action of the tongues 15ª and 16ª is similar to that above described so then further description is not considered necessary.

It will be apparent that in each of the above forms the fastener is of one piece construction made from sheet metal. By the use of suitable dies, such fastener can be efficiently and economically produced in large quantities and although they may be readily and conveniently applied, the locking tongues insure that they are securely locked in place.

What I claim is:

A fastener for a screw comprising a sheet metal body portion, an upwardly projecting frusto-conical portion integral at its base with said body portion and having a free upper edge, said frusto-conical portion being slotted radially from said free upper edge, said free upper edge being deformed helically downward from one side of said slot to the other to engage the thread of a screw, an upstanding polygonally shaped flange integral with and continuously circumscribing said body portion, the sides of said flange being integral with one another and including a pair of substantially opposed sides, a pair of tongues extending inwardly and upwardly in a substantially straight line from the upper edges of said substantially opposed sides, the upper edges of said tongues being deformed to conform to the thread of the screw to which the fastener is applied whereby, upon tightening of the fastener on a screw said tongues flex axially so that said helically deformed upper edge and said tongues all bite in substantially the same direction into the threads of the screw securely to hold the fastener in place.

HAROLD W. KOST.

REFERENCES CITED

The following references are of record in the file of this patent:

UNITED STATES PATENTS

| Number | Name | Date |
|---|---|---|
| 1,885,459 | McDonnell | Nov. 1, 1932 |
| 1,920,792 | Hotchkin | Aug. 1, 1933 |
| 2,169,057 | Place | Aug. 8, 1939 |
| 2,191,689 | Tinnerman | Feb. 27, 1940 |
| 2,215,560 | Oddie | Sept. 24, 1940 |
| Re. 22,049 | Tinnerman | Mar. 10, 1942 |
| 2,295,480 | Johnson | Sept. 8, 1942 |
| 2,377,694 | Judd | June 5, 1945 |
| 2,394,491 | Schaper | Feb. 5, 1946 |

FOREIGN PATENTS

| Number | Country | Date |
|---|---|---|
| 64,854 | Denmark | Oct. 7, 1946 |
| 474,494 | Great Britain | Nov. 2, 1937 |